US006564505B1

(12) United States Patent
Anderson

(10) Patent No.: US 6,564,505 B1
(45) Date of Patent: May 20, 2003

(54) ARTICLE RETRIEVING TOOL

(76) Inventor: Rebecca J. Anderson, 8989 E. Jewell Cir., Denver, CO (US) 80231

(*) Notice: Subject to any disclaimer, the term of this patent is extended or adjusted under 35 U.S.C. 154(b) by 0 days.

(21) Appl. No.: 10/083,742

(22) Filed: Feb. 27, 2002

(51) Int. Cl.[7] .................................... A01M 3/04

(52) U.S. Cl. .................................... 43/136

(58) Field of Search .................................... 43/134, 136, 132

(56) References Cited

U.S. PATENT DOCUMENTS

| | | | | |
|---|---|---|---|---|
| 537,660 A | | 4/1895 | Wood | 43/137 |
| 834,039 A | * | 10/1906 | Bailey | 43/115 |
| 1,190,165 A | | 7/1916 | Hemenway et al. | 43/136 |
| 1,237,081 A | | 8/1917 | Mott, Jr. | 43/137 |
| 1,334,246 A | | 3/1920 | Kelso | 43/137 |
| 1,361,337 A | | 12/1920 | Kelso | 43/137 |
| 1,802,774 A | * | 4/1931 | Nixon | 43/115 |
| 2,736,129 A | | 2/1956 | Roop | 43/137 |
| 2,963,816 A | | 12/1960 | De Miller | 43/137 |
| 3,191,339 A | * | 6/1965 | Dougherty | 43/137 |
| 4,653,789 A | | 3/1987 | McWilliams | 294/1.1 |
| 4,759,150 A | * | 7/1988 | Pierce | 43/136 |
| 4,905,408 A | | 3/1990 | Wu | 43/137 |
| 5,058,314 A | | 10/1991 | Frascone | 43/137 |
| 5,095,648 A | * | 3/1992 | Keenan | 43/133 |
| 5,630,290 A | | 5/1997 | Wade et al. | 43/136 |
| 5,634,293 A | | 6/1997 | Mike et al. | 43/136 |
| 6,055,767 A | * | 5/2000 | Carter | 43/137 |
| 6,067,746 A | * | 5/2000 | Kistner et al. | 43/135 |
| 6,185,862 B1 | * | 2/2001 | Nelson | 43/136 |

* cited by examiner

*Primary Examiner*—Michael J. Carone
*Assistant Examiner*—Jordan M Lofdahl
(74) *Attorney, Agent, or Firm*—Roger A. Jackson

(57) ABSTRACT

Multi-purpose tools are constructed of a tool head (9)(32)(53) and an extension (15)(36). A pad (16)(45)(52) can be attached to the tool head with one or more of a retainer (13), rubber bands (46)(59) and clips (60). The pad includes adhesive (24) coated sheets (22) and one or more of a seat (17), rubber bands, elastic dots (66) and a backing (18)(47)(58). Elastic elements (25)(40)(62) are attached to anchor hooks (19)(20)(41)(63) and where it is desired to bend the pad, the elastic element is stretched and connected to a desired positioning hook (14)(39)(64).

13 Claims, 6 Drawing Sheets

ARTICLE RETRIEVING TOOL

BACKGROUND OF THE INVENTION

This invention relates to multi-purpose tools that can be configured to have surfaces ranging from flat to wedge shaped and are used, for example, as fly swatters and as retrievers of objects in difficult-to-reach locations.

It is particularly useful to those who can't bend easily, e.g., a wheelchair-bound individual.

Well-known insect swatters of the past include a variety of designs based on the use of screen wire, e.g., U.S. Pat. No. 537,660 to F. W. Wood and U.S. Pat. No. 1,237,081 to J. L. Mott, Jr. Other perforated swatters use holes, e.g., U.S. Des. Pat. No. 401,304 to Kate L. Hawkins and slots, e.g., U.S. Pat. No. 2,736,129 to N. W. Roop. Since users break the handles or wear out the swatter head, a variety of mechanisms have been created to make repairs. The creativity utilized is depicted in exemplary U.S. Pat. No. 884,216 to F. M. Schmidt, U.S. Pat. No. 2,736,129 cited above; U.S. Pat. No. 2,963,816 to M. E. DeMiller and U.S. Pat. No. 4,905,408 to C. R. Wu et al and U.S. Pat. No. 5,630,290 to B. R. Wadeet al.

Another approach to the disposition of small insects and animals includes the use of adhesives, especially where the kill or capture is to be on a ceiling or on the floor adjacent a wall. Typical swatters are shown in a variety of U.S. Patents: U.S. Pat. No. 4,653,222 to T. N. Viscosi teaches a typical swatter configuration except that a pad and adhesive papers is seated within swatter head having a rim around the edges at a height which allows the top adhesive sheet to hit the insect, but not the surface on which the insect is resting.

U.S. Pat. No. 5,634,293 to A. V. Mike et al teach a swatter with a slit. A folded member having adhesive on the external folded surface is inserted through the slot with the center of the fold extending to the rear and then opened across the front of the swatter to expose the adhesive-clad inner surfaces. When a pest is adhered, the inner surfaces are again dosed for disposal of the entombed pest U.S. Pat. No. 6,055,767 to T. D. Carter teaches a one-piece handle/swatter combination with a pad of sheets having the form of the swatter where the pads are made up of sheets with an adhesive on each side for quick adhesion to the swatter.

SUMMARY OF THE INVENTION

The tools of this invention have a handle and/or a fixture which can be attached to a handle extension or another tool and which enlarges into a tool head. The tool head includes at least one mechanism for attaching a pad of adhesive coated sheets, a pad supporting extension and elastic and hook elements for bending the pad to predetermined shapes.

DETAILED DESCRIPTION OF THE INVENTION

The numbers of the figures are not all consecutive. Alternative configurations are identified by alphabetic designators.

Figure 1:
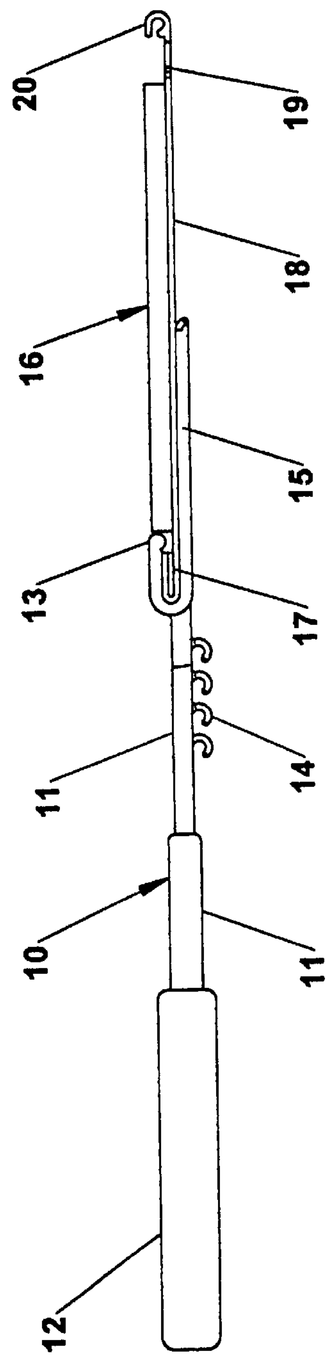
FIG. 1 is an edge view of a preferred tool of this invention.

FIG. 1 shows a tool 10 which has a telescoping handle with sections 11 and a hand grip 12. The handle 11 enlarges into a tool head which includes a fixed retainer 13 on the upper side, as viewed, and a series of positioning hooks 14 and a short extension 15 on the lower side. A pad 16 is positioned by a seat 17 which is made up of a folded-over section of the backing 18 adhered to the adjacent portion of the backing 18.

Figure 2:
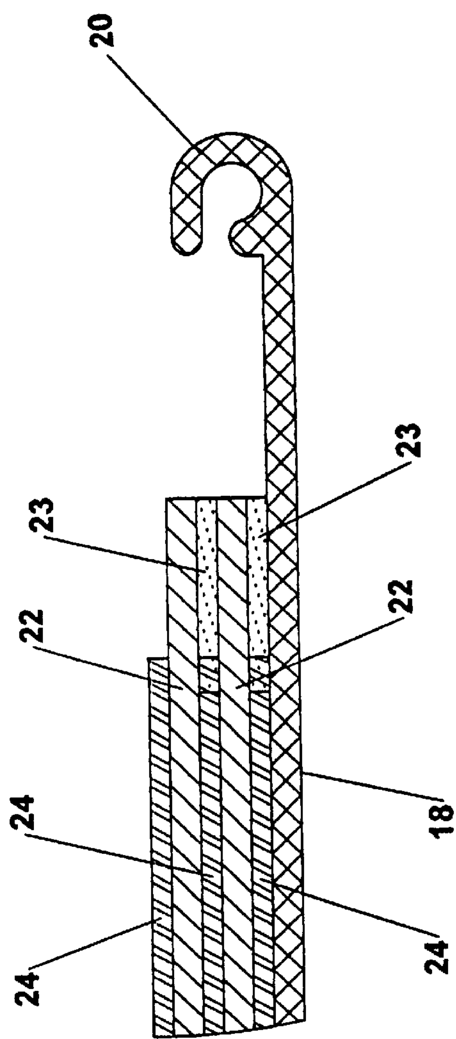
FIG. 2 is a detailed partially sectioned view of a preferred pad of adhesive coated sheets for use with the tool of FIG. 1.

The diagrammatic cutaway pad 16 of FIG. 2 shows a detailed section of the “right” end of backing 18, with a lateral anchor hook 19 and centered elastic element anchor hook 20 (FIG. 3) at the opposite end. Two exemplary sheets 22 are affixed to backing 18 and each other by a releasable adhesive layers 23. Backing 18 is stiff enough to allow the tool to be used as a swatter, flexible enough to curl around the end of extension 15 and resilient enough to return substantially to its original shape (see FIGS. 5 and 6). Sheets 22 also have, on their lower side as shown, a sheet-to-sheet adhesive 23 and on their upper side, a layer 24 of an adhesive selected to adhere to the items to be retrieved.

Figure 3:
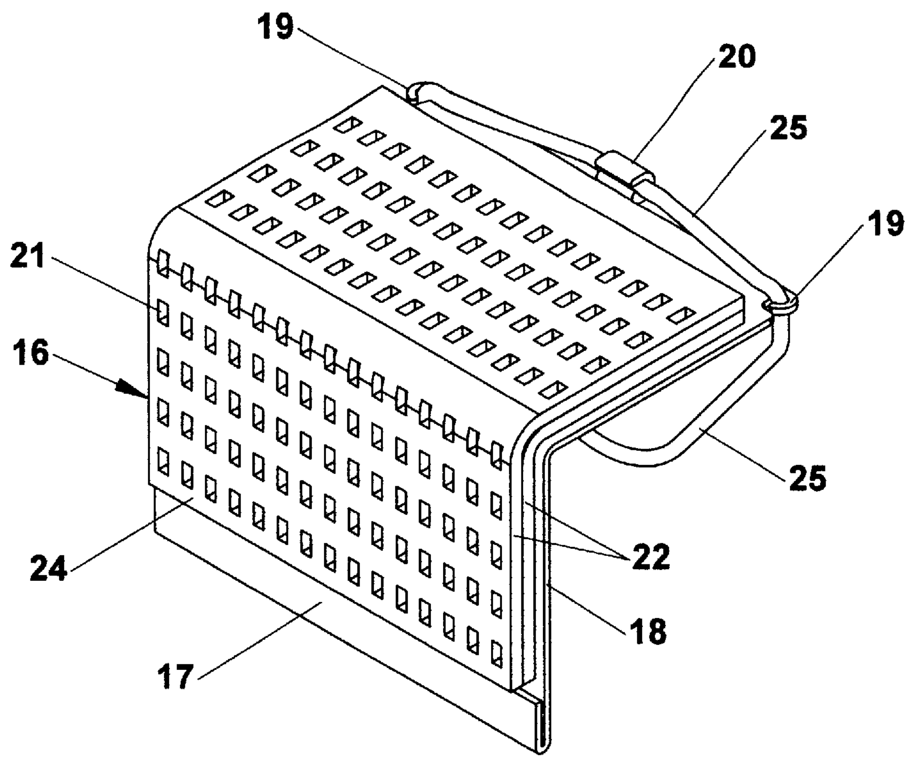
FIG. 3 is a perspective view of the pad of FIG. 2 bent at a 90° angle and an elastic element for use in bending the pad.

FIG. 3 depicts a pad 16 with a seat 17 and a backing 18. At the upper end of backing 18 are lateral anchor hooks 19 and a central anchor hook 20. Slots 21 provide an airflow to enhance the movement of tool 10 through the air. The pad also has two single sheets 22 covered by an adhesive layer 24. A rubber band 25 is shown positioned within anchor hooks 19 and 20.

Figure 4:
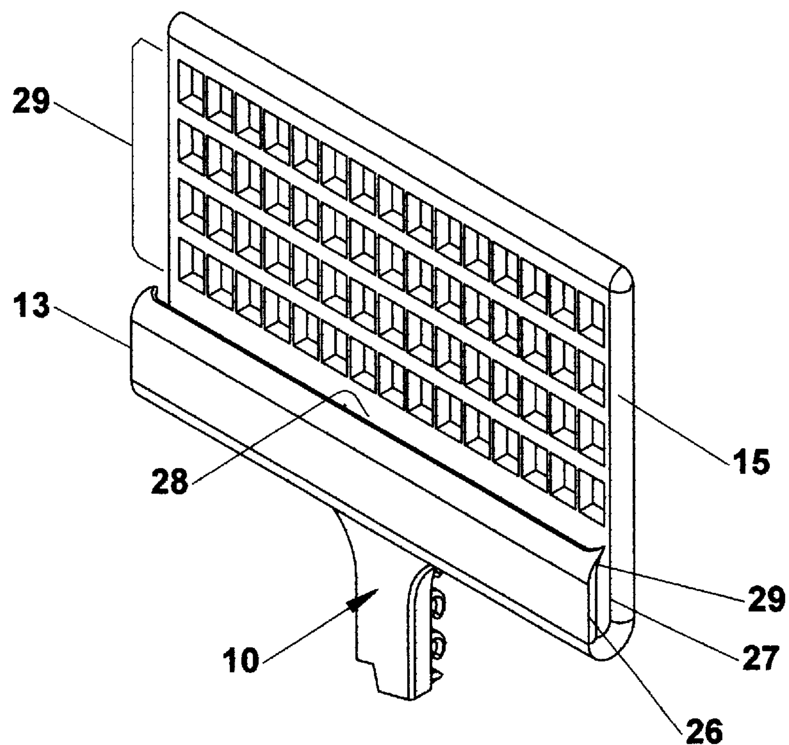
FIG. 4 is a perspective, partially cut away view detailing a fixed retainer of the type used in FIG. 1.

The upper end of cutaway handle 10 of FIG. 4 includes a retainer 13 and extension 15. The inner lateral edges 26 of retainer and the corresponding portion 27 of extension 15 are tapered inwardly so that the seat 17 of pad 16 (FIG. 3) can be inserted into and retained within a cavity 28. The use of a grid 29, which aligns efficiently with slots 21 (FIG. 3) provides desired air flow. The retainer 13 can extend upwardly to project over the lower edge of the sheets when pulled up by pad 16 during the bending process.

Figure 6:
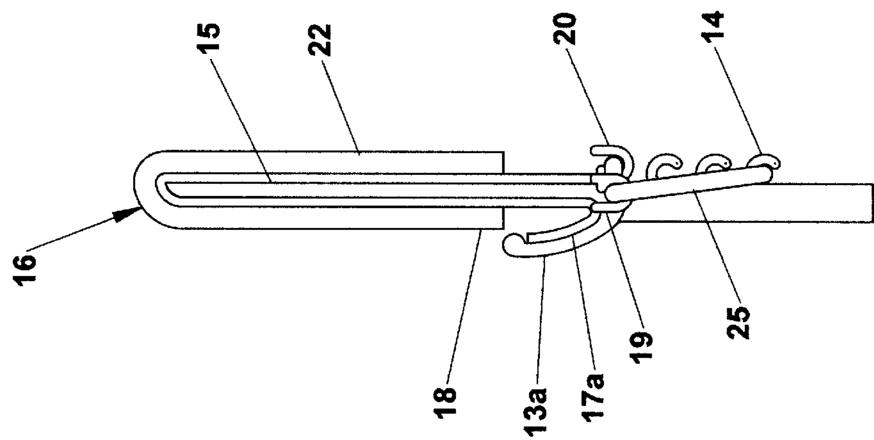
FIGS. 5 and 6 are edge views illustrating angles to which the preferred pad 16 of FIG. 2 can be bent.
Figure 5:
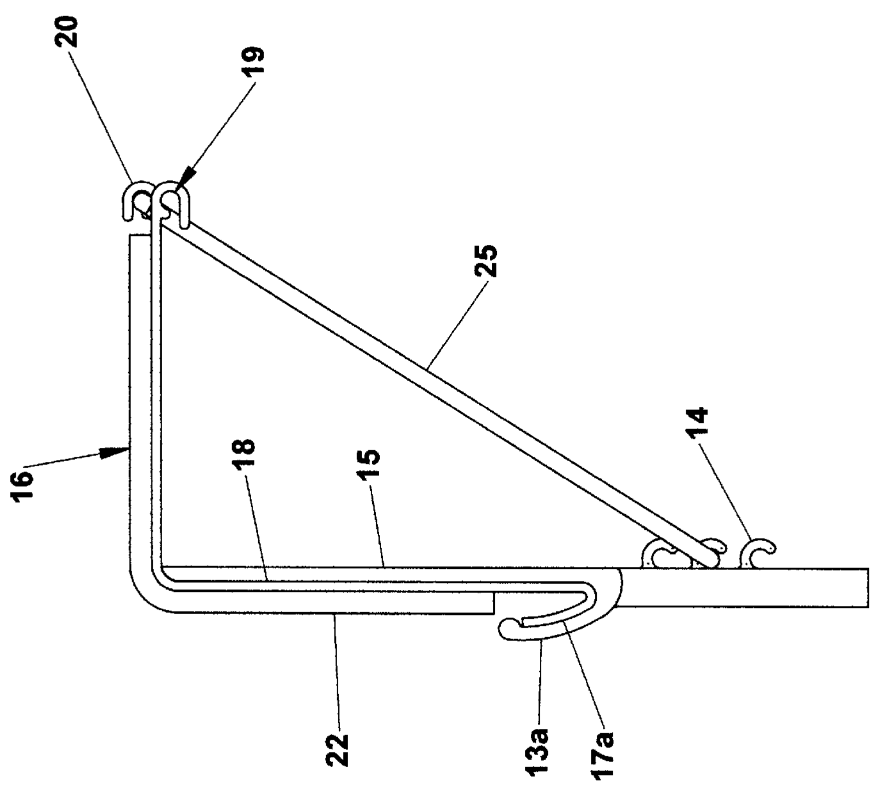

FIGS. 5 and 6 each outline the upper portion of a tool 10 having a pad 16 with one thick sheet 22 attached to pad backing 18, and bent, respectively, into a right angle over short extension 15 at substantially a 90° and 180° positions.

Figure 8:
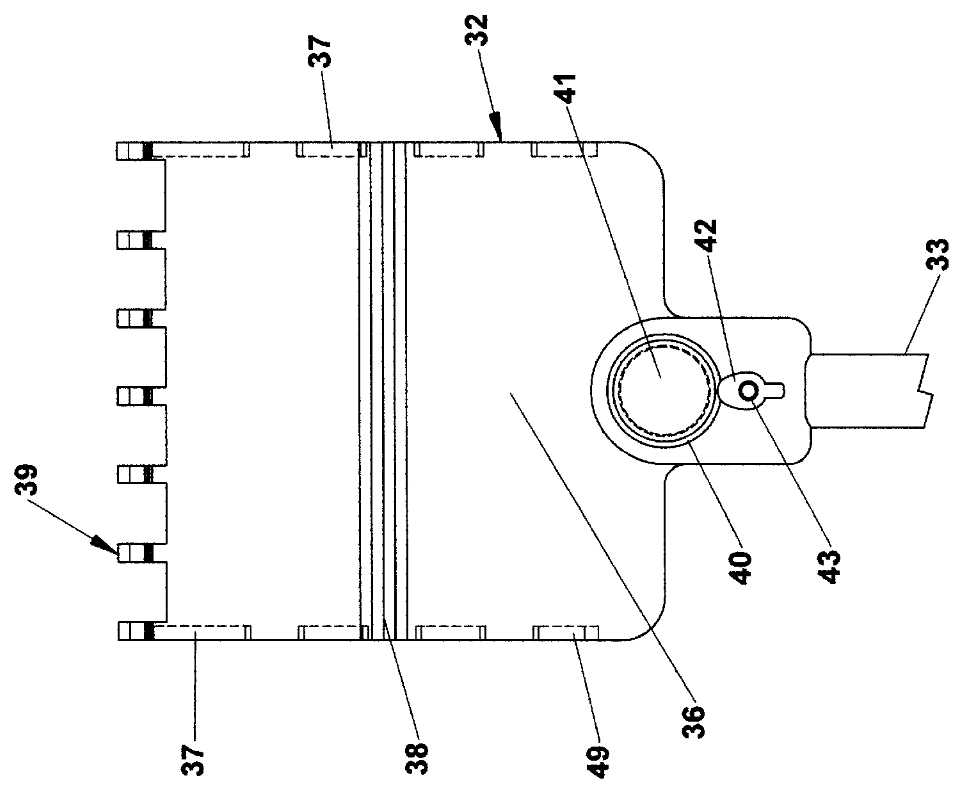
FIGS. 7 and 8 are edge and rear views, respectively, of a second preferred model of this invention.
Figure 7:
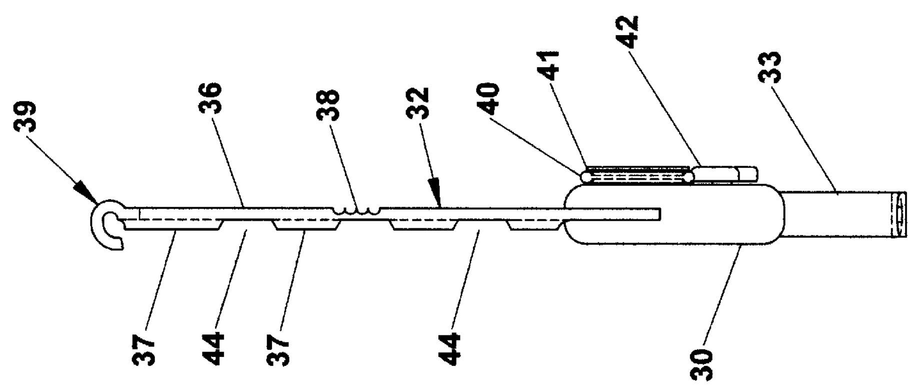

The views of FIGS. 7 and 8 depict a second illustrative model tool head 32 designed for the primary use as an insect and small animal swatter. Tool head 32 has a replaceable handle 33 with a tongue (not shown) which seats in a socket (not shown) in the tool head base 30. Any practical locking mechanism can be utilized, e.g., that of U.S. Pat. No. 2,736,129 to N. W. Roop. The tool head frame 36 has front facing ridges 37 and a rear facing illustrative series of grooves 38 which permit frame 36 to be bent at various angles up to a wedge shape. At the top of frame 36 is a number of positioning hooks 39 for attachment by an elastic element 40. At the lower rear of frame 36 is a "T" shaped anchoring hook 41 or a circle of hooks around which elastic element 40 rests when not in use. The elastic element 40 is kept in place by a camming member 42. Camming member 42 is held in place by a screw 43. Gaps 44 provide spaces for the placement of the elastic bands 46 of the pad 45 of FIG. 9.

To obtain a bend in frame 36 of increasing degrees of angle, elastic element 40 is placed within spaced apart positioning hooks 39. Where it is desirable to have a rounded pad face, the elastic element 40 is placed around one or more positioning hooks 39 on opposite ends of the pad. Similarly, the pad face can be curved by attaching the elastic element 40 on only one side of the pad.

Figure 9:
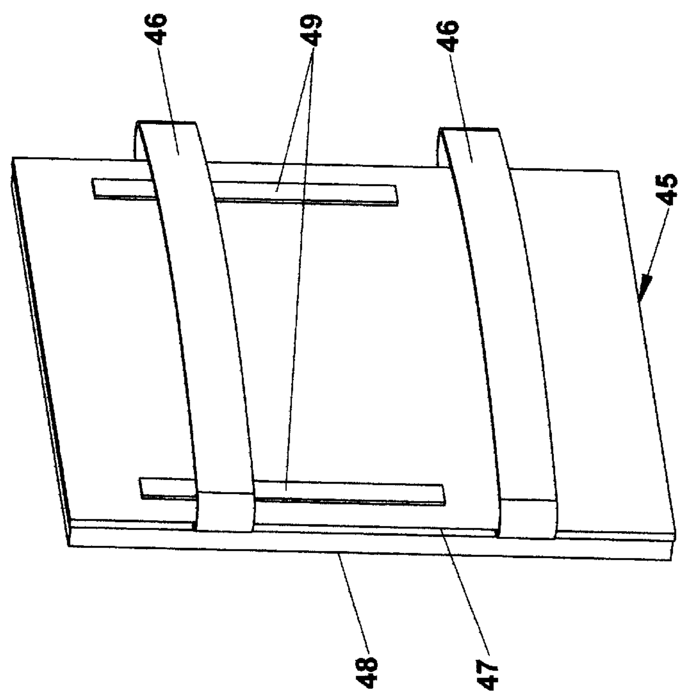
FIG. 9 is a simplified perspective view of a second preferred type of pads to that are useful in the tool of FIGS. 7 and 8.

In FIG. 9, the rear view of pad 45 shows two elastic bands 46 attached to the pad backing 47 to which a thick adhesive coated sheet 48 is attached. Two well attached spring metal or plastic spring strips 49 are attached to pad backing 47 to ensure a full return (verticalizaton) of the pad 45 after bends.

Figure 12:
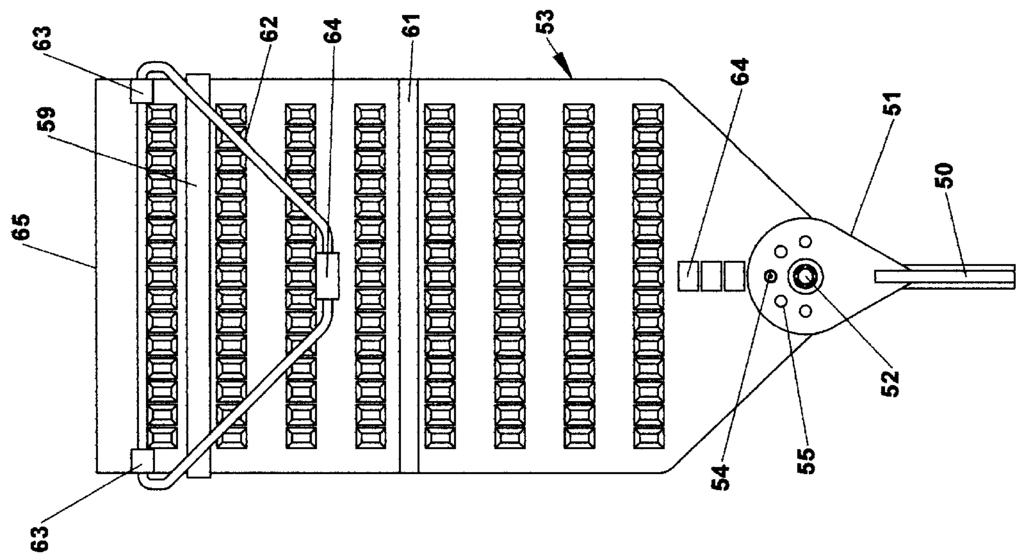
FIGS. 10–12 are depictions of the front side and rear of the most preferred model of this invention.
Figure 11:
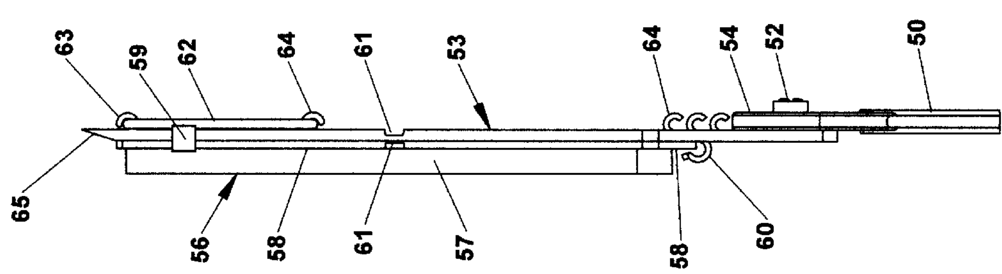
Figure 10:
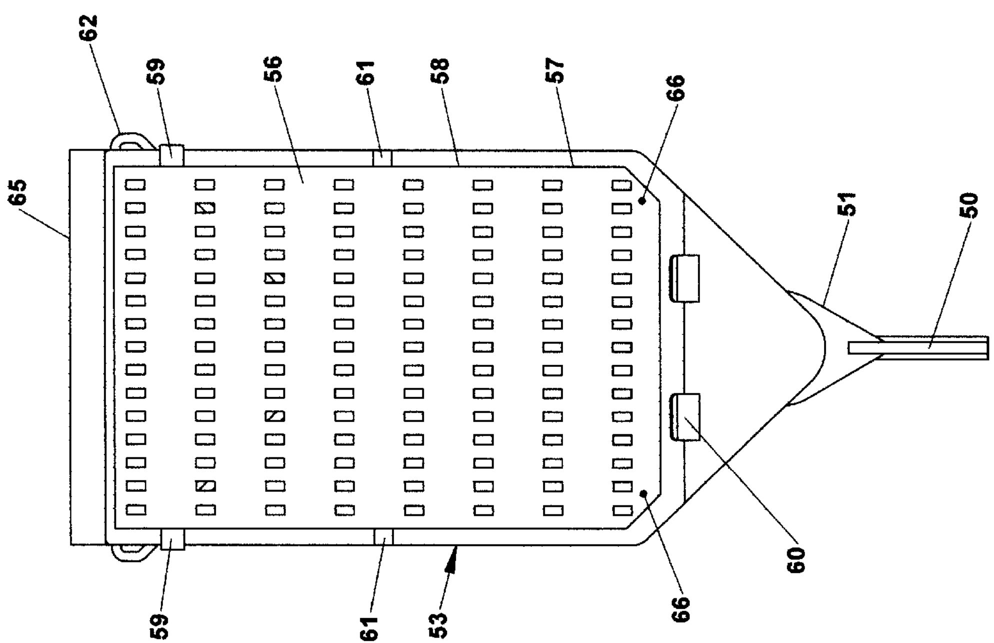

The model of FIGS. 10–12 has a handle 50 with an enlarged end 51 which pivots around a rivet, screw or bolt 52 (FIG. 12). The rivet, screw or bolt 52 allows rotation of tool head 53. A Phillips-head screw or other locking mechanism 54 is shown placed in the center of five holes 55 to fix the angle of the tool head 53 with respect to the handle 50. An outlined pad 56, including adhesive-coated sheets 57 (FIG. 11), is removably affixed to a backing 58 which is attached to the tool head 53 through the use of one or more elastic bands 59. The elastic band 59 slips over tool head 53 when the pad 56 is put into place and is positioned by clips 60 which clip onto the pad backing 58 at a point below (See Figured 11) the ends of the adhesive-coated sheets 57. A pair of opposed grooves 61 in backing 58 facilitate the bending of the tool head 53 through the use of an elastic element 62 (FIG. 12). The elastic element 62 is attached via anchor hooks 63 and used to bend tool head 53 by affixing the elastic element 62 within one of the lower positioning hooks 64 (See FIGS. 11 and 12) rather than the upper positioning hook 64 which is used when the tool is intended for use as a swatter.

A scraper edge 65 is shown at the upper edge of tool head 53. Dots 66 (FIG. 10) are of a highly elastic, highly resilient rubber or resin and link the rear of one sheet 57 to the front of an adjacent sheet 57 and stretch to prevent the sheets from fanning out when the tool head 63 is bent.

Figure 13:
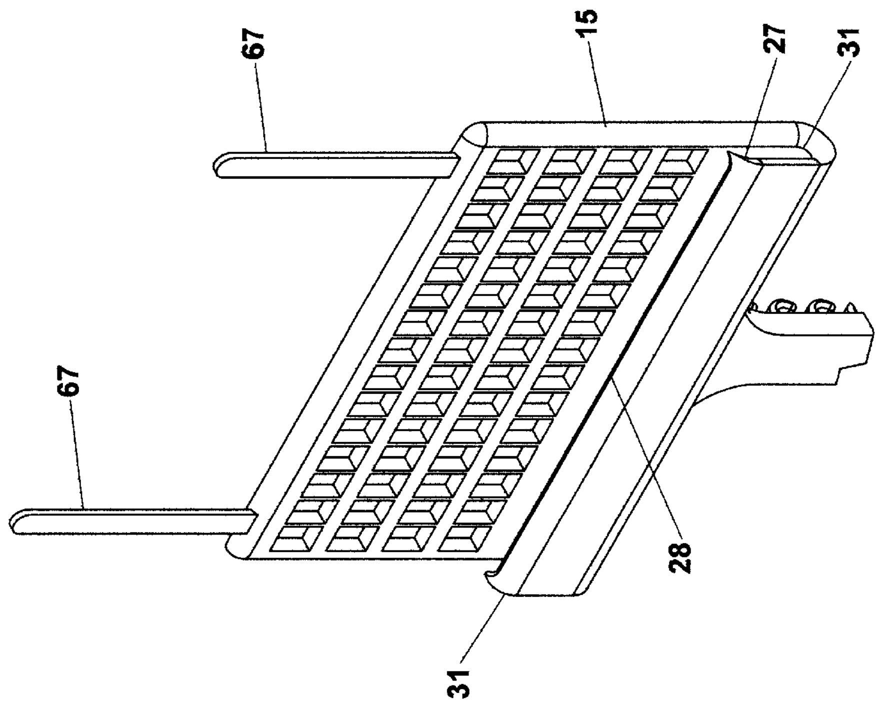
FIG. 13 depicts a modification of the unit of FIG. 4 having pad verticalizaton springs.

FIG. 13 depicts verticalization springs 67 extending from the "upper" edge of an extension 15 of the unit of FIG. 4. This configuration eliminates any need for the springs 49 used in the model pad 45 of FIG. 9.

GENERAL TEACHING OF THE INVENTION

The variety of models depicted suggest still further models. Thus, the extendable handles of FIG. 1 are not limited to the types used in small households and low-ceilinged offices. For example, the handles can be adapted to be screwed onto or otherwise connected to any of the extension "poles" used today, for example, by house painters and others.

As indicated by the Figures, a variety of pad shapes and degrees of open spaces can be utilized within the pad. The pad backing extensions can be of any practical length. Similarly, the mechanisms for attaching the pads are shown ranging from releasable adhesives, to retainers forming enclosures for a seat on the bottom of the pad, to rubber bands and clamps. While only a single retainer unit is shown, retainers and/or clips can be positioned at both the top and bottom of a full extension to position pads with double seats. The "tool head"-to-handle angle can also be varied. Thus, the pad can be bent or curved vertically or laterally through the use of one or more elastic element and hook configurations of ways. A variety of mechanisms are known for rotating elements such as the tool head vis a vis the handle in addition to the examples provided in the Figures.

Generally, the pad backing will be constructed of a resilient, paper product, plastic or metal. It may be that, however, the backing is no more than a curved adhesive layer used in binding books on pads or a uniform adhesive layer similar to the partial adhesive layer 23 of FIG. 2. The pad backing can also be a composite structure with stiff upper and lower portions connected to flexible materials inserted at desired points, usually at the center line. Further, where the backing is not resilient, metallic or plastic, springs can be used to provide the desired resiliency, either by attachment to the pad backing, the pad holder backing or to an extension.

The "adhesive" coatings can be selected for particular uses, e.g., polar adhesives can be made of polar molecules in adhesive layer 24, for example, utilized for most insects, small animals and industrial waste particulates. The "adhesives" can also be minimally or non-adhesive but have sufficient depth to enable enough pressure to be applied to "stick" glass shards, metal filings and other sharp objects into the coating as well as to adhere to it. In a proper setting, adhesives can be omitted, e.g., hooks from "hook and loop" fasteners can be the adhesive of choice, e.g., for picking up some types of materials.

The elastic element can normally be in the form of a "rubber band" but can also be a coiled spring circlet of predetermined elasticity, strength and size. The elastic elements can be continuous or an elastic piece joined at the ends by a crimped metal fastener or the like. Alternately, the elastic element can have hooks, holes or enlargements which can be fitted into complementary hooks, projections, etc.

What is claimed is:

1. A multi-purpose tool for collecting objects comprising a) a tool head having an extension and at least one retainer;

b) a pad, having a plurality of adhesive coated sheets and a backing, attachable to at least one of the retainer and the extension;

c) at least one each of an anchoring hook and a positioning hook attached to at least one of the pad and the tool head;

d) attachment means for attaching the pad to the tool head;

e) an elastic element of predetermined properties attachable to the tool head by at least one anchoring hook and connectable to the at least one positioning hook.

2. The multi-purpose tool of claim 1 wherein the tool head has a retainer.

3. The multi-purpose tool of claim 1 wherein the tool head has a retainer and positioning hooks.

4. The multi-purpose tool of claim 1 wherein the tool had has a detachable handle.

5. The multi-purpose tool of claim 1 wherein the tool has a pad further including a seat.

6. The multi-purpose tool of claim 5 wherein the pad includes at least one each of anchoring hook and a positioning hook.

7. The multi-purpose tool of claim 5 further including a handle.

8. The multi-purpose tool of claim 7 having at least one of a positioning or an anchoring hook.

9. The multi-purpose tool of claim 1 further including an elastic element attached to at least one anchoring hook.

10. A tool head of claim 1 having an elongated extension with a retainer for a pad in the form of at least one clip on one side of the elongated extension and, on the opposite side, at least one each of an anchoring hook and a positioning hook; a pad including a plurality of elastic coated sheets and a backing having proximate to one end an elastic band of an elasticity and predetermined size to hold the pad securely in place on the elongated extension and on the other end a backing which extends beyond the plurality of elastic coated sheets a distance sufficient for retention by the at least one clip.

11. The tool head of claim 10 further including positioning mechanism for mounting a handle on the tool head at predetermined angles which is interactive with a complementary mechanisms mounted on the handle.

12. The tool head of claim 10 having a constriction in the elongated extension to facilitate the bending of elongated extension.

13. The tool head of claim 10 including a short extension.

* * * * *